Dec. 29, 1942.  T. F. MENZEL  2,306,400
INFUSION PACKAGE HEAT SEALING FILTER-PAPER MANUFACTURE
Original Filed May 17, 1940   2 Sheets—Sheet 1
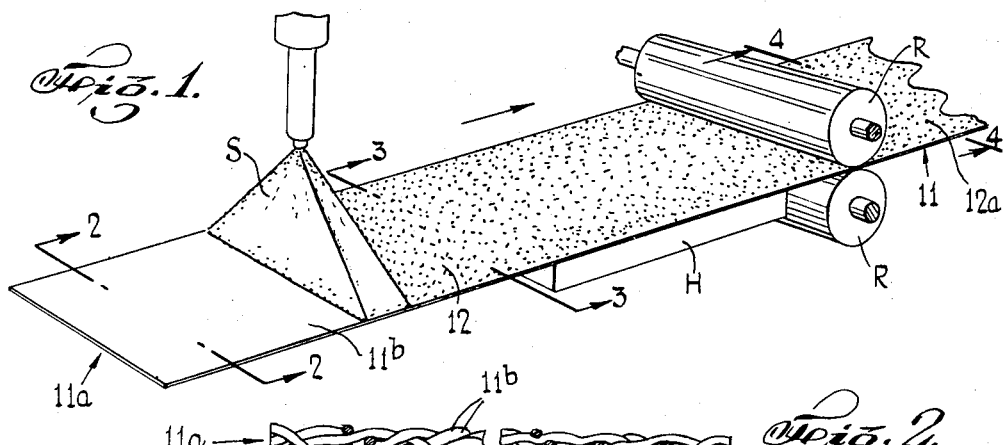
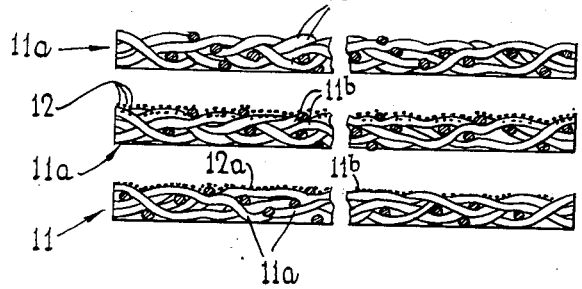
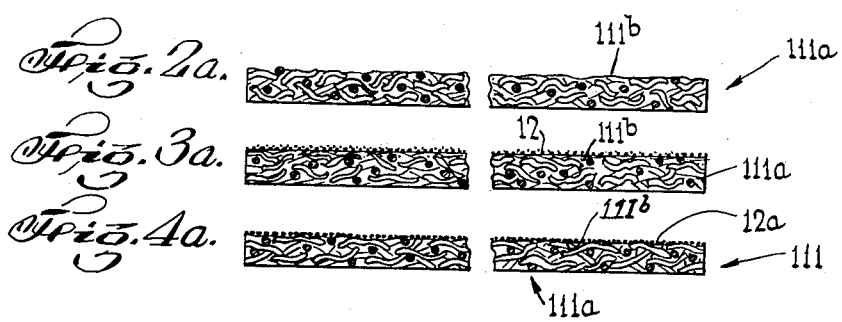
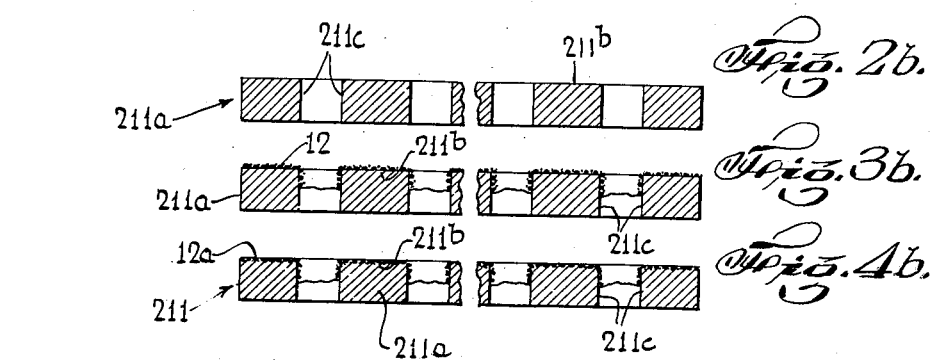
INVENTOR.
Theodore F. Menzel.
BY Louis Barnett
ATTORNEY.

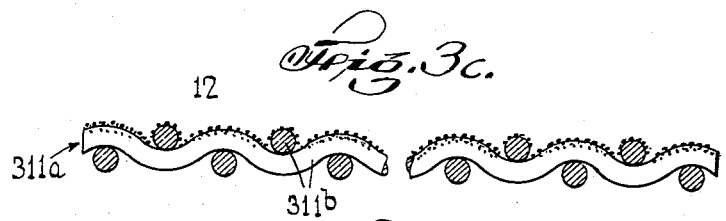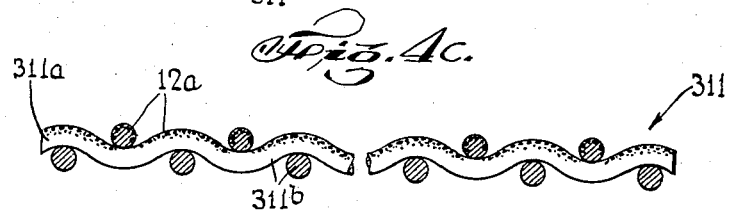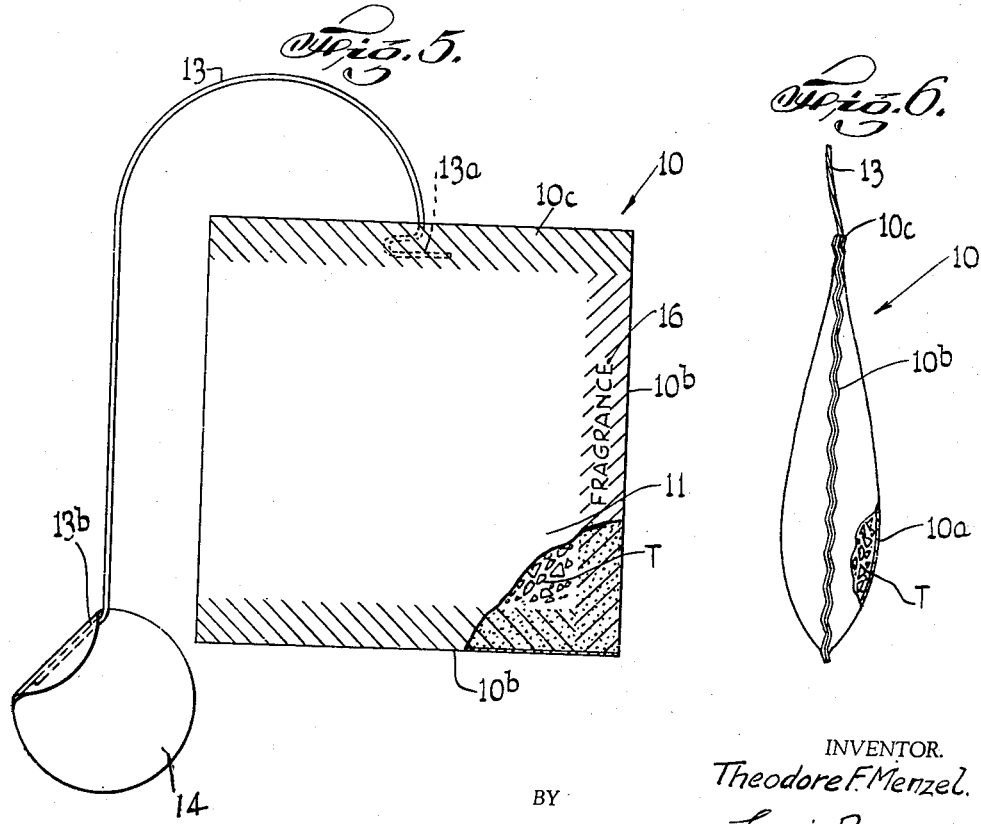

Patented Dec. 29, 1942

2,306,400

UNITED STATES PATENT OFFICE 2,306,400

INFUSION PACKAGE HEAT SEALING FILTER-PAPER MANUFACTURE

Theodore F. Menzel, Long Island City, N. Y., assignor to Millie Patent Holding Co., Inc., a corporation of New York Original application May 17, 1940, Serial No. 335,694. Divided and this application December 18, 1940, Serial No. 370,588

12 Claims. (Cl. 117—16)

This invention relates to the manufacture of a heat sealing sheet material for packaging filled containers or bags, as for example, infusion packages like tea-balls, coffee balls and the like.

Among the objects of the invention is to generally improve the method of manufacturing heat sealing filter sheet material which has as an integral part thereof heat sealing properties so as to require no additional adhesive, and which permits heat sealing of closures, joints and seams to eliminate the usual mechanical fastening means, such as sewing, stitching or stapling commonly used for such purpose, which shall comprise few elementary parts formed by a simple method and adapted to be incorporated in inexpensive articles of new, neat and attractive appearance, which shall be particularly suitable for large scale production with high speed automatic bag making, filling and sealing machines, and which improved method of manufacture and sheet material shall be efficient and practical to a high degree.

This case is a division of my application Serial No. 335,694, filed May 17, 1940 for Packaging and the manufacture of heat sealing filter sheet material therefor.

Other objects of this invention will in part be obvious and in part hereinafter pointed out.

The invention accordingly consists in the features of constructions and method, combinations of elements, arrangements of parts and steps in the process of manufacture which will be exemplified in the constructions and method hereinafter described and of which the scope of application will be indicated in the following claims.

In the accompanying drawings in which is shown various possible illustrative embodiments of this invention;

Fig. 1 is a diagrammatic perspective view illustrating the process for manufacturing heat sealing filter sheet material embodying the invention:

Figs. 2, 3 and 4 show detailed enlarged sectional views of the heat sealing filter sheet material at successive progressive steps during the manufacture thereof using a filtering sheet material formed of a vegetable fibrous pulp as a base layer, taken at lines 2—2, 3—3 and 4—4 in Fig. 1;

Figs. 2a, 3a and 4a show detailed enlarged sectional views of the heat sealing filter sheet material showing successive progressive similar steps to Figs. 2, 3 and 4, using a filter sheet material formed of cotton staple pulp as a base layer;

Figs. 2b, 3b and 4b show detailed enlarged sectional views of the heat sealing filter sheet material showing successive progressive steps similar to Figs. 2, 3 and 4, using a filtering sheet material formed of perforated parchment paper or Cellophane sheet, as a base layer;

Figs. 2c, 3c and 4c show detailed enlarged sectional views of the heat sealing filter sheet material showing successive progressive steps similar to Figs. 2, 3 and 4 using a cotton gauze textile sheet material, as a base layer; and Figs. 5 and 6 are front and side elevational views, respectively, of a complete tea-ball with string handle and tag constructed to embody the invention.

In practising the embodiment of the invention for manufacturing tea or coffee balls 10 and particularly heat sealing filter sheet material 11 for constructing the container or bags 10a thereof, a suitable filter paper sheet in the form of base layer 11a, such as made from a vegetable fibrous pulp stock may be used, and when processed in the manner hereinafter described forms sheet material 11 from which containers or bags 10a of the tea or coffee balls 10 are made. The filter paper layer 11a alone preferably should have sufficient strength to retain the shape and form of the tea-ball 10 on immersion in boiling water without damage or disintegration, and serves to permit ready passage therethrough of the water of immersion for forming a brew and to strain the filling or contents T, such as tea, or coffee from passing out of the ball 10, said layer 11a being of such composition that it is insoluble, is non-toxic, and does not impart in the slightest degree any odor or taste to the brew and has no chemical reaction therewith.

Referring now to Fig. 1, the process of manufacturing the improved heat sealing filter sheet 11 is seen to consist in thinly spreading a finely divided plastic 12 over one side 11b of successive travelling surface portions of filter paper sheet base layer 11a passing under suitable spraying or sprinkling means S, said base layer 11a being preferably in the form of a moving web or strip, a section thereof being shown in Fig. 2. The plastic used may be a synthetic resin of the prenol, urea, formaldehyde, glycerol, phthalic anhydride, acetylene, rubber and petroleum group, and provides the heat sealing means in the manner hereinafter described. The specific group of synthetic resin here selected to produce heat sealing filter sheet 11 illustrating an embodiment of the invention is a thermosetting polymerizing resinous product such as powdered or finely granulated copolymer of vinyl chloride and vinyl acetate, which will leave the heat sealing filter sheet 11 after being processed with no part thereof that will dissolve, give off any odor, alter the taste, or otherwise impart toxic or injurious effects as a food product when incorporated in the finished tea or coffee ball 10 and immersed in boiling water for brewing.

The base layer 11a spread with said plastic 12 over one surface 11b thereof is next heated by any suitable means, such as heater H, to a degree sufficient only to cause the plastic 12 to flow, that is, to soften and cohere, and in which state it is pressed between suitable rollers R or the like to form a pervious film, lamina or superficial coating 12a of finely divided inorganic material adhering to said side 11b of the base layer 11a, as shown in Fig. 4. The degree of heat applied to said plastic 12, however, is insufficient to cause a permanent setting of the plastic forming coating 12a. When said coating 12a is a copolymer of vinyl chloride and vinyl acetate, heating temperature of approximately 65° C. will be found satisfactory. Because the base layer 11a used is formed of a vegetable fibre pulp, the rolled coating 12a adheres and is retained by an adsorption thereof around and about the pulp fibres as a pervious structure without substantially decreasing the original porosity or practically effecting the filtering capacity of the paper base layer 11a.

After base layer 11a with the lamina or rolled coating 12a is cooled to room temperature it hardens, which will hereinafter be referred to as "partial fusion" or being "partially fused." In this state said coating 12a is dry and forms with the base layer 11a the heat sealing sheet material 11 which remains flexible and may be coiled up in rolls (not shown) in the well understood manner, ready for use in making containers or bags 10a for ball 10. Heat sealing sheet material 11 when used for the last named purpose is cut into proper size for manufacturing bag 10a which when filled with the contents T, such as tea or coffee, and closed forms the ball 10. The containers or bags 10a are each constructed with the coating 12a side of the sheet material 11 as the interior surface thereof. The edge joints or seams 10b and top closure seam 10c are made by having the coating 12a portion thereof placed in face to face relation, pressed together and heated to a fusion temperature by suitable clamp means of any well known construction to unite the parts forming said edge joint seams 10b or closure seam 10c sealed in permanently fused adhesion. With coatings 12a formed of copolymer of vinyl chloride and vinyl acetate, such permanent sealing fusion of said seams will take place when pressed and heated to about 130° C. by suitable clamping and heating means.

It has been found in practice that a 6½ pound fibrous pulp stock sheet of approximately .001 inch thick forms a practical filter paper layer 11a for the purposes described herein. On said layer 11a the finely powdered copolymer of vinyl chloride and vinyl acetate uniformly sprinkled or sprayed and "partially fused" and rolled thereon provides a satisfactory pervious, dry, extremely thin coating 12a of approximately three ounces in weight for each pound of the layer 11a and normally less than .0005 inch thick.

Referring now to Figs. 5 and 6, where it is desired to provide a string handle 13 of cotton strands terminated by a tag 14, the strands of the string handle preferably may be processed with a plastic 12 to a "partially fused" state in the manner similar to that described above in the manufacture of heat sealing sheet material 11. An end 13a of the string handle 13 may be inserted between the coated side face to face portions 12a of said sheet material 11 during the formation of the top closure joint or seams 10c, and the final sealing heat applied simultaneously to anchored end 13a within the joint seams 10c and the entire joint seam 10c for permanently fusing thereof.

To secure the tag 14 to the terminating or free end 13b of the string handle 13 opposite the anchored end 13a, one side of each tag 14 may also be processed in the manner described above in the manufacture of heat sealing sheet material 11 to provide a "partially fused" coating side, and if desired may be folded over said processed string handle end 13b therebetween. The "partially fused" plastic material side of said tag 14 in face to face relation and the string handle end 13b may be united on pressure and application of heat to a degree for permanent fusion.

While the above described method of attaching the string 14 to the string handle end 13b is preferred, it is to be understood that such attachment may also be accomplished by simply pressing and permanently fusing the string handle end 13b to the "partial fused" coated side of the tag 14 without folding of the latter.

In Figs. 2a, 3a and 4a there is illustrated the results of successive steps of the improved manufacturing process applied to a filter paper base layer 111a formed of cotton staple pulp stock having an upper surface 111b on which the said plastic 12 is thinly spread, and which when heated, rolled and cooled for "partial fusion" provides a lamina or superficial dry coating 12a as part of heat sealing filter sheet material 111 in the same manner as described above for the heat sealing filter sheet material 11. The coating 12a formed on the side 111a coheres and is retained by an absorption thereof on the portion of the side 111b of cotton staple pulp of base layer 111a as a pervious structure without substantially decreasing the original porosity of said filter paper base layer 111a.

Although filter paper base layer 111a formed of cotton staple pulp stock has a much lower tensile strength when wet and immersed in hot water than filter paper base layer 11a of the same thickness formed of vegetable fibre pulp stock, the addition of the superficial coating 12a on either of said layers 11a or 111a increases the wet tensile strength of each, and in the case of base layer 111a makes the same of sufficient strength to be practical for making all types of tea balls 10 which otherwise would not be possible. A thinner grade or lighter stock of filter sheet layer 11a or 111a can also be used than would otherwise be required in making bag 10a if the superficial coating 12a was not provided.

In Figs. 2b, 2c and 2d there is shown successive steps of the improved manufacturing process applied to a filter base layer 211a formed of a parchmentized paper, Cellophane or the like base layer, perforated at 211c and having an upper surface 211b on which a superficial coating or lamina 12a is formed from spread "partially fused" plastic 12 embodying the invention to provide heat sealing filter sheet material 211, the parchmentized paper base layer 211a being of the type used for cooking purposes. Clogging up the perforation 211c may be eliminated when providing the coating 12a by an additional step (not shown) of blowing air upwardly through the layer 211a to clear the perforation 211c before the "partial fusion" of said coating 12a takes place.

Instead of using as base layers 11a, 111a and 211a described above, a filter cotton gauze or woven textile base layer 311a may be substituted in practising the invention, said base layer 311a having an upper surface 311b on which the finely divided plastic 12 is thinly spread and which when processed to provide the superficial coating or lamina 12a forms a heat sealing filter sheet 311 which may be used like heat sealing filter sheet material 11, 111 and 211 described above. Here again the superficial coating 12a is retained by an absorption thereof on portions of the upper surfaces of the cotton strands of the side 311b forming the gauze layer 311a as a pervious structure without substantially decreasing the original porosity of said filter cotton gauze base layer 311a.

The superficial coating 12a also serves to increase the tensile strength of heat sealing filter sheet material 211 and 311 so that the base layer materials 211a and 311a, respectively, may be thinner than is practically required when such coating 12a is not used.

Each of the heat sealing filter sheet materials 111, 211 and 311 remain flexible and may be coiled up like sheet material 11 described above, and any one of said sheet materials 11, 111, 211 or 311 may be utilized for forming the bags 10a by providing permanently fused joint seams in the entire construction or in part thereof and for making complete tea ball 10 with string handles 13 and tags 14 in the same manner as described above.

If desired the fused edge portions may be impressed or embossed by suitable die (not shown) with word, legend or symbol 16 on application of molding pressure during the permanent fusing of the seam joint 10b as shown in Fig. 5.

It will thus be seen that there is provided a package, package making material and a method for producing the latter in which the several objects of the invention are achieved and which are well adapted to meet the conditions of practical use.

As various other possible embodiments of the invention might be made of the above invention, and as various changes might be made in the embodiments above set forth, it is to be understood that all matters herein set forth or shown in the accompanying drawings and described in the specification is to be interpreted as illustrative and not in a limiting sense.

Having thus described my invention, I claim as new and desire to secure by Letters Patent:

1. A flexible heat sealing filter sheet for making infusion packages comprising a filter base layer having a thin dry porous lamina of thermoplastic material adheringly applied by a "partial fusion" to one side of said layer without materially decreasing the original filtering capacity of the latter, said lamina being capable of forming permanent thermosetting fused seam joints when positioned in face to face relation and heated above the temperature at which said "partial fusion" takes place.

2. In combination, a filter sheet free from thermosetting material and a dry porous "partially fused" coating of thermosetting plastic applied to one side of said sheet, said combination being so constructed and arranged to permit filtering therewith with substantially the same practical efficiency as with the filter sheet material without said coating, said coating serving as a heat sealing means when portions thereof are brought in face to face relation and subjected to heat for permanent fusion above the heat necessary to "partially fuse" the coating.

3. A multi-layer sheet material for making bags of infusion packages comprising a first layer formed of a porous base web, and a second layer formed of a dry foraminous thermosetting plastic film spread and carried on one side of said web to serve as a heat sealing means and to strengthen the web without substantially decreasing the porosity thereof, said heat sealing means being effective when portions of the film on said web are placed in face to face relation and thermosettingly fused.

4. A thin sheet material of the character described comprising a foraminous layer sheet having a filter film of a "partially fused" thermosetting resin adhering to one side of said layer sheet, said layer sheet with the film having substantially the same filtering capacity as the foraminous layer sheet without said film, the latter serving as a heat sealing means when portions thereof are placed in face to face relation and heated to a degree to cause a final fusion of said portion for permanent adhesion.

5. A method of producing a heat sealing filter sheet material of the character described consisting in "partially fusing" a coating of thermosetting plastic on one side of a filter base sheet material while retaining substantially the original porosity of said base sheet material with said coating in condition to permit permanent heat sealing fusion thereof at a temperature above that of the "partial fusing" state.

6. A method of producing a heat sealing filter sheet material of the character described consisting in spreading in a thin pervious layer material having thermosetting properties on one side of a filter base sheet, and heating said layer material below the temperature to cause permanent fusion for forming on cooling a dry porous lamina having heat sealing properties at said fusion temperature.

7. The process of manufacturing a heat sealing filter sheet material consisting of sprinkling a finely divided polymerizing resin over successive continuously travelling surface portions of a thin filter sheet material, heating said resin to a degree short of final fusion and pressing the same into the surface to form an adhering pervious film on said sheet material without materially decreasing the original filtering capacity of said filter sheet material, and cooling said surface film to a dry condition having heat sealing properties such that when portions thereof are placed superimposed in face to face relation to form a joint seam and a final fusion heat at a temperature above said heat to form the adhering film applied such seam is permanently sealed.

8. A filter sheet material of the character described comprising a pervious base web structure initially free from the thermo-plastic material yet of sufficient strength when wet to withstand immersion in hot water without disintegration, and a porous "partially fused" lamina of heat sealing material carried to extend over one side of said web structure, the composition of said web structure and lamina being such as to be insoluble in hot water, the latter being odorless, tasteless and non-toxic after said immersion.

9. A filter sheet material of the character described comprising a thin porous base web of a structure to permit the ready passage of water in a brewing operation, a finely divided polymerizing resin "partial fused" adheringly spread over one side of said web to form an adhering pervious superficial coating without substantially reducing the capacity of the web to permit said ready passage of water.

10. The filter sheet defined in claim 9 in which the wet tensile strength thereof is sufficient to withstand disintegration during said brewing operation and which has properties that are insoluble, odorless, tasteless and non-toxic in use for the brewing operation of a beverage.

11. A heat-sealing sheet material for making bags of infusion packages, such as tea-balls, coffee-bags and the like articles comprising a filter sheet layer base having an initial wet strength sufficient to retain the shade and form of infusion packages made therewith when immersed in boiling water without disintegration, and a dry porous insoluble lamina having thermosetting heat-sealing properties adheringly applied on at least one side of said layer base without substantially decreasing the filtering capacity of said layer, said base with said lamina when serving as containers of said infusion packages and immersed in boiling water being inherently free from imparting injurious effects as a food product.

12. A composition product for making bags of infusion packages consisting of a porous dry film lamina of a vinyl resin bonded by the application of heat at a temperature below that of permanent fusion to one side of a paper which has a high wet strength porous structure for providing a filtering sheet, said film lamina on the paper being in a "partially fused" thermosetting condition capable of forming a permanently thermoset fused seam joint when positioned and pressed in face to face relation with the application of heat above said bonding temperature.

THEODORE F. MENZEL.